United States Patent [19]

Osisek

[11] Patent Number: 5,555,385
[45] Date of Patent: Sep. 10, 1996

[54] ALLOCATION OF ADDRESS SPACES WITHIN VIRTUAL MACHINE COMPUTE SYSTEM

[75] Inventor: Damian L. Osisek, Vestal, N.Y.

[73] Assignee: International Business Machines Corporation, Armonk, N.Y.

[21] Appl. No.: 143,404

[22] Filed: Oct. 27, 1993

[51] Int. Cl.⁶ ........................................... G06F 9/26
[52] U.S. Cl. ................ 395/401; 395/77; 395/402; 395/406; 395/650; 395/418
[58] Field of Search ..................... 395/775, 650, 395/400; 364/200

[56] References Cited

U.S. PATENT DOCUMENTS

| | | | |
|---|---|---|---|
| 4,253,145 | 2/1981 | Goldberg | 364/200 |
| 4,456,954 | 6/1984 | Bullions, III et al. | 364/200 |
| 4,792,895 | 12/1988 | Tallman | 364/200 |
| 4,802,084 | 1/1989 | Ikegaya et al. | 364/200 |
| 4,816,991 | 3/1989 | Watanabe et al. | 364/200 |
| 4,831,541 | 5/1989 | Eshel | 364/200 |
| 4,835,734 | 5/1989 | Kodaira et al. | 364/900 |
| 5,018,064 | 5/1991 | Nakayama et al. | 364/200 |
| 5,220,669 | 6/1993 | Baum et al. | 395/775 |
| 5,339,417 | 8/1994 | Connell et al. | 395/650 |

FOREIGN PATENT DOCUMENTS 0480546 12/1985 European Pat. Off. .

*Primary Examiner*—David K. Moore
*Assistant Examiner*—Than V. Nguyen
*Attorney, Agent, or Firm*—Arthur J. Samodovitz

[57] ABSTRACT

A virtual machine computer system permits more than one guest/virtual machine to share a single address space and each control access by its applications to the shared address space. The computer system comprises a host operating system for creating first and second virtual machine guests. The first guest responds to an address space creation request from a first application executing in the first guest to allocate an address space, by determining at least in part a storage region for the address space. The first guest also responds to a request from the first application to grant shared access by a second application executing in the second guest to the address space, by notifying the host operating system that the second guest or the second application is authorized to access the address space. The second guest responds to a request from the second application to access the address space, by determining that the second application has authority to access the address space. Then, the second guest grants access to the second application. The guest and host operating systems both participate in the address translation process for a host managed address space.

28 Claims, 19 Drawing Sheets

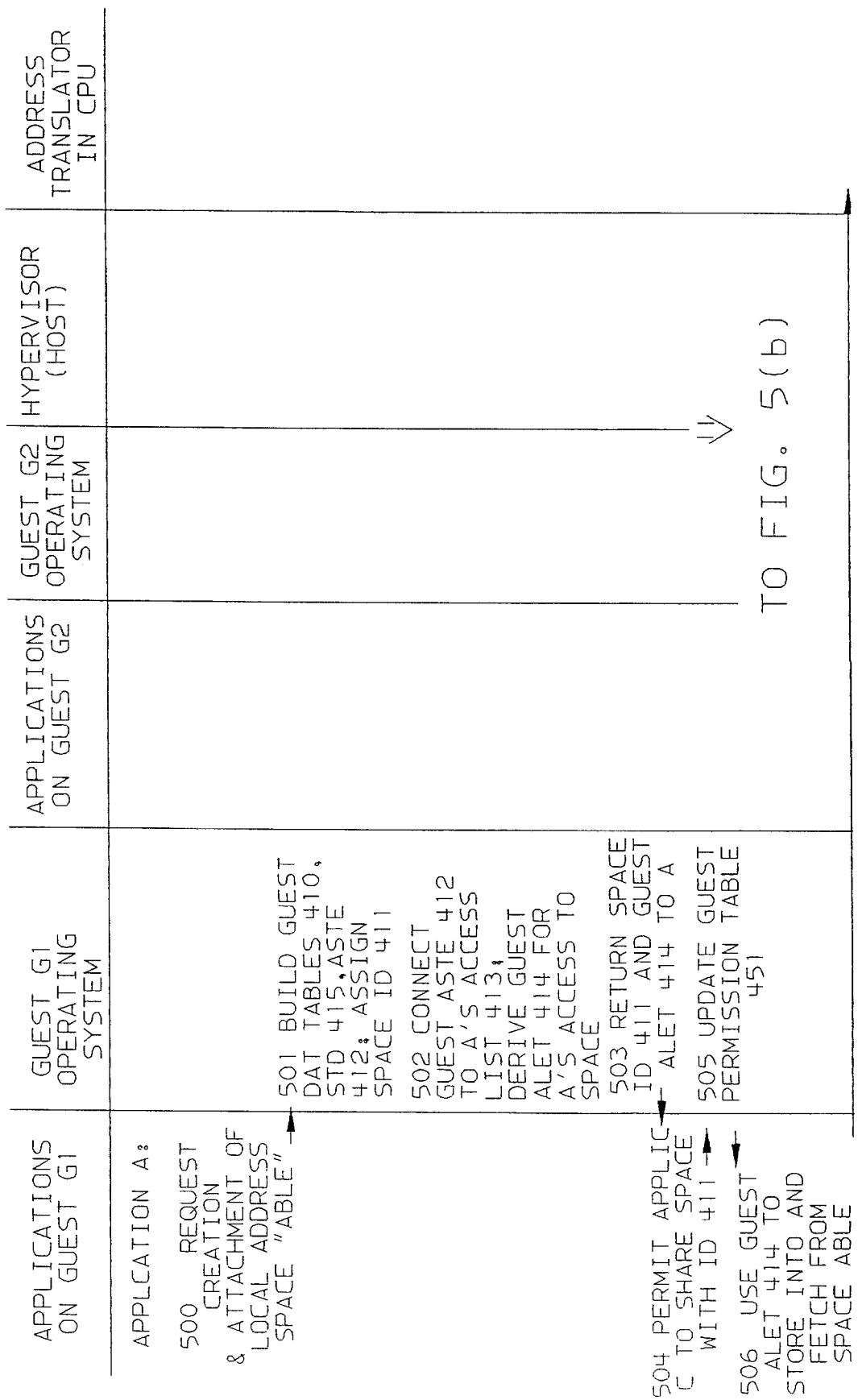

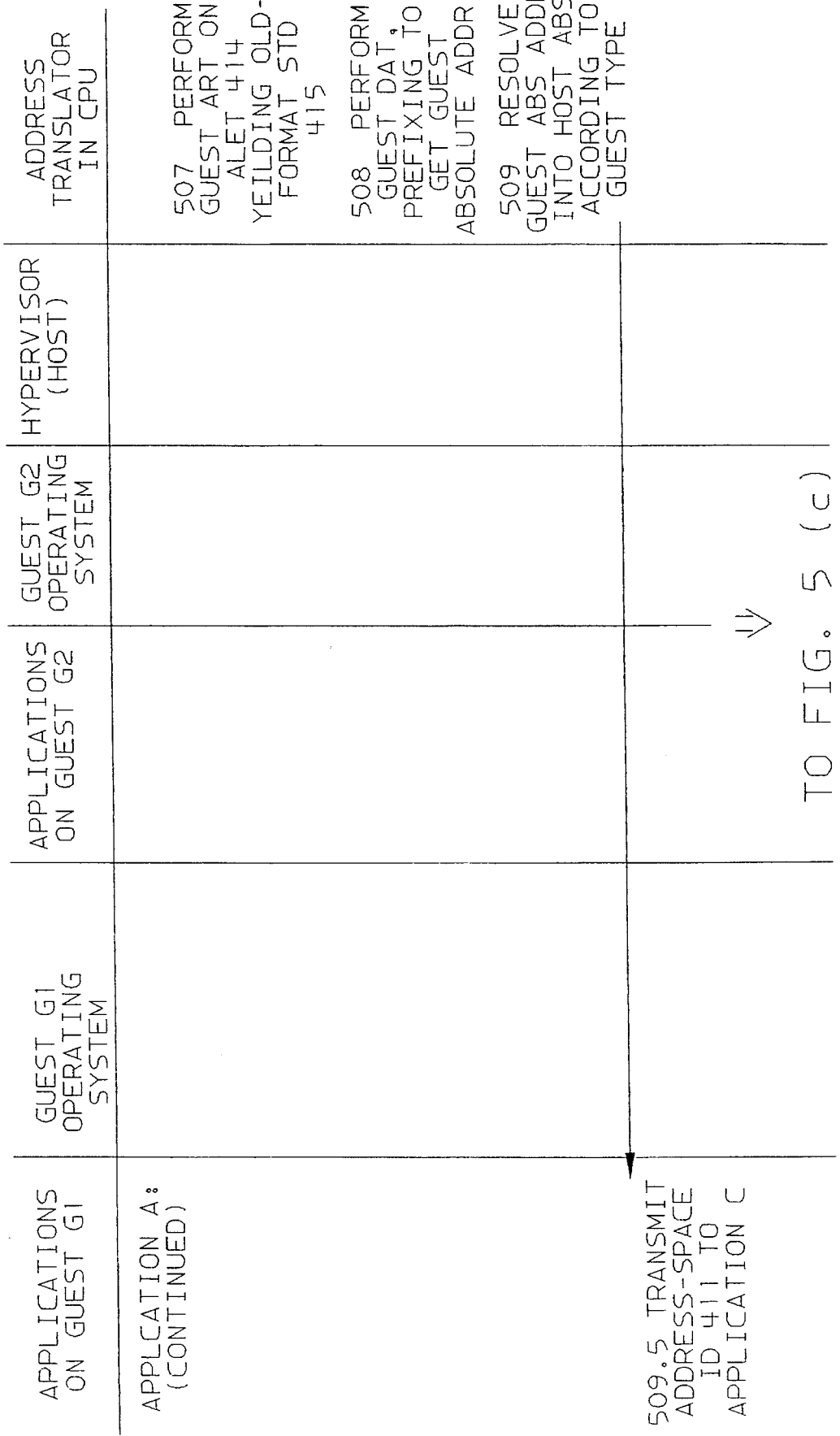

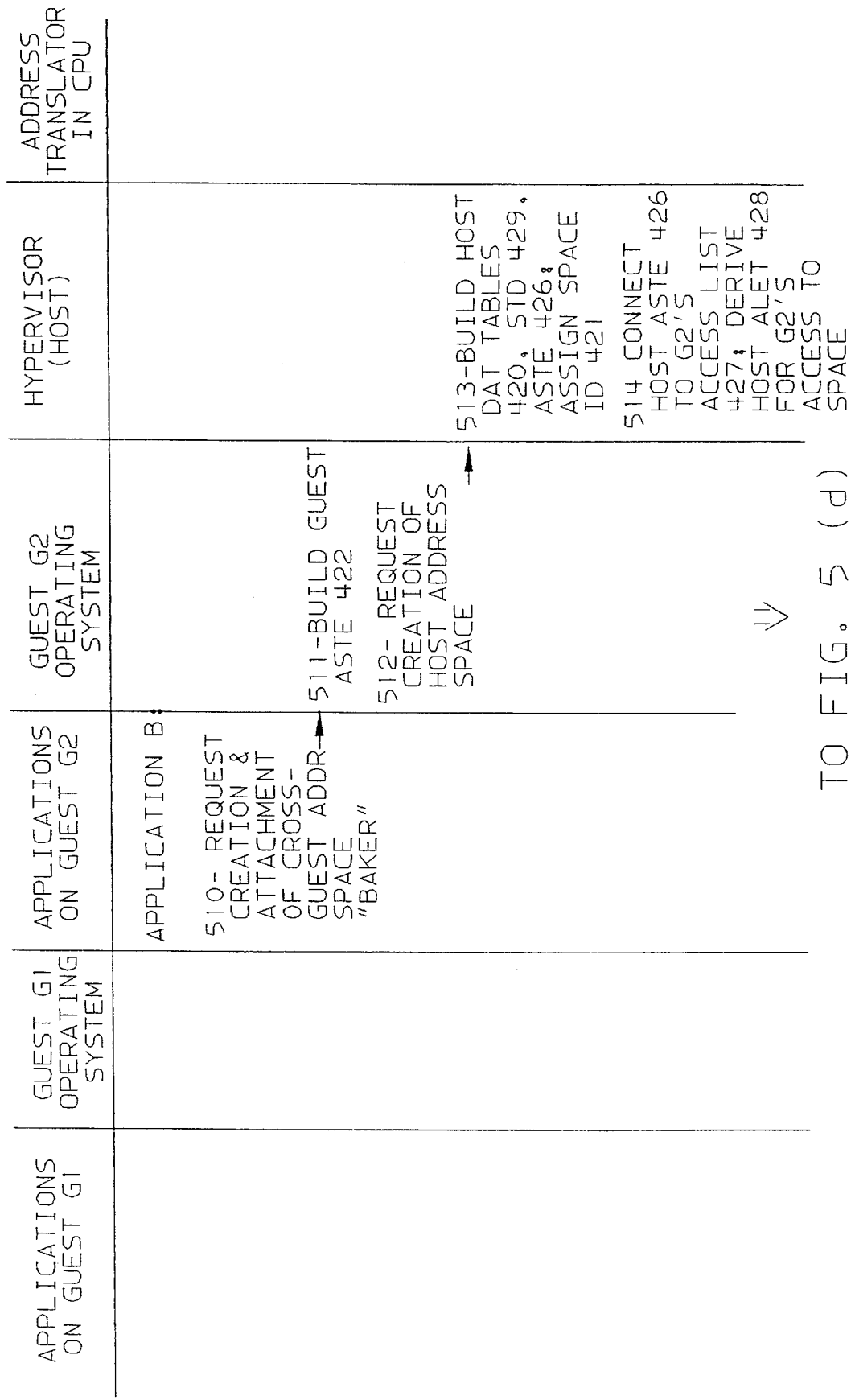

FIG. 5(d)

| APPLICATIONS ON GUEST G1 | GUEST G1 OPERATING SYSTEM | APPLICATIONS ON GUEST G2 | GUEST G2 OPERATING SYSTEM | HYPERVISOR (HOST) | ADDRESS TRANSLATOR IN CPU |
|---|---|---|---|---|---|
| | | APPLICATION B: (CONTINUED) | 516 PLACE HOST ALET 428 INTO NEW FORMAT GUEST STD 425 WITHIN GUEST ASTE 422<br><br>517 CONNECT GUEST ASTE 422 TO B'S ACCESS LIST 423; DERIVE GUEST ALET 424 FOR B'S ACCESS TO SPACE<br><br>518 RETURN SPACE ID 421 AND GUEST ALET 424 TO B | 515 RETURN SPACE ID 421, HOST ALET 428 | |

TO FIG. 5(e)

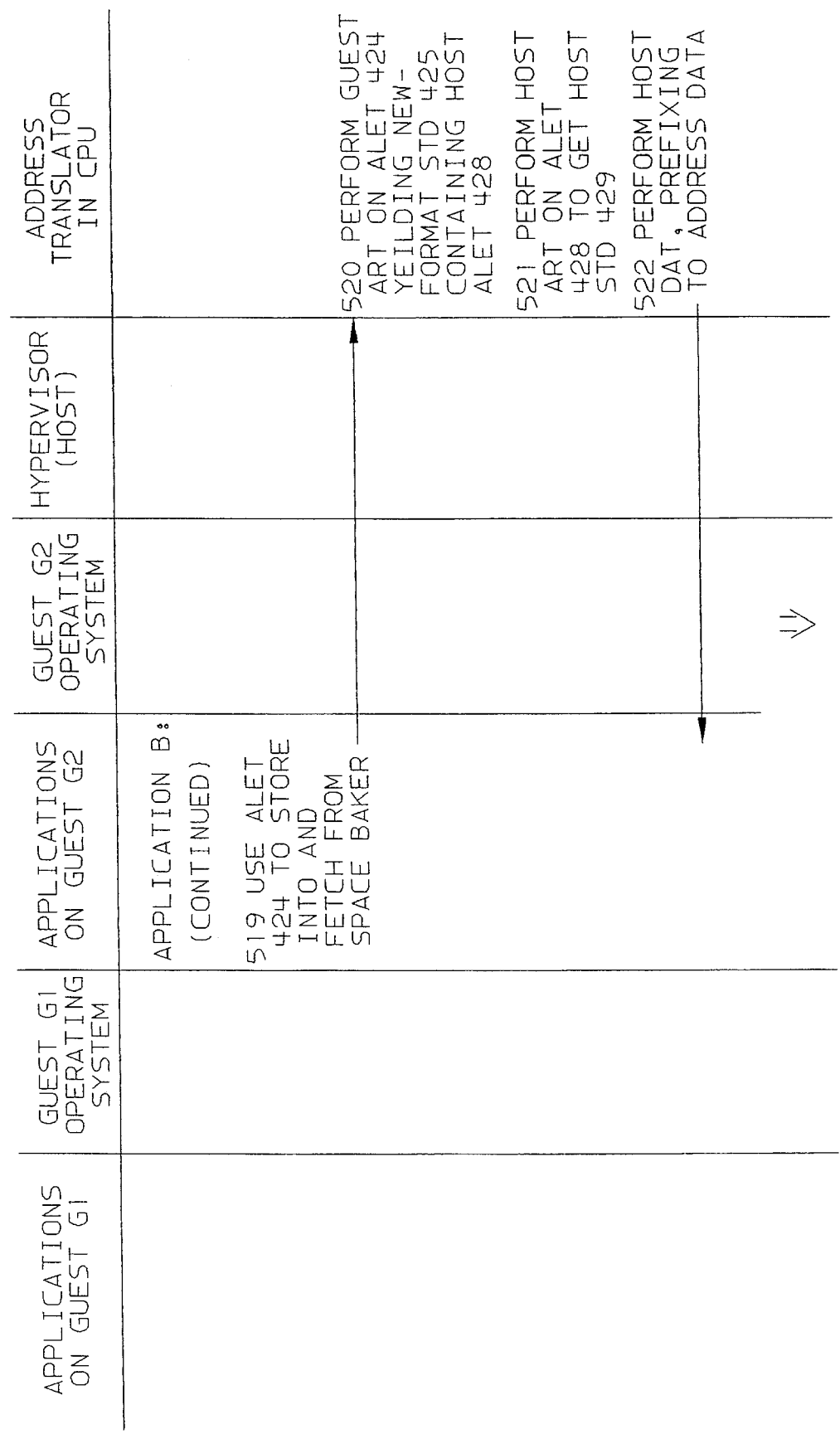

FIG. 5(g)

| APPLICATIONS ON GUEST G1 | GUEST G1 OPERATING SYSTEM | APPLICATIONS ON GUEST G2 | GUEST G2 OPERATING SYSTEM | HYPERVISOR (HOST) | ADDRESS TRANSLATOR IN CPU |
|---|---|---|---|---|---|
| | | APPLICATION B: (CONTINUED) | | 537 ADD HOST ASTE 426 TO G1'S ACCESS LIST 417; DERIVE HOST ALET 438 FOR G1'S ACCESS TO SPACE | |
| | 539 BUILD GUEST ASTE 432; PLACE HOST ALET 438 INTO NEW-FORMAT GUEST STD 435 WITHIN ASTE 432<br><br>540 UPDATE GUEST PERMISSION TABLE 451 TO ALLOW C ACCESS TO SPACE WITH ID=421 | | | 538 RETURN HOST ALET 438 | |

TO FIG. 5(h)

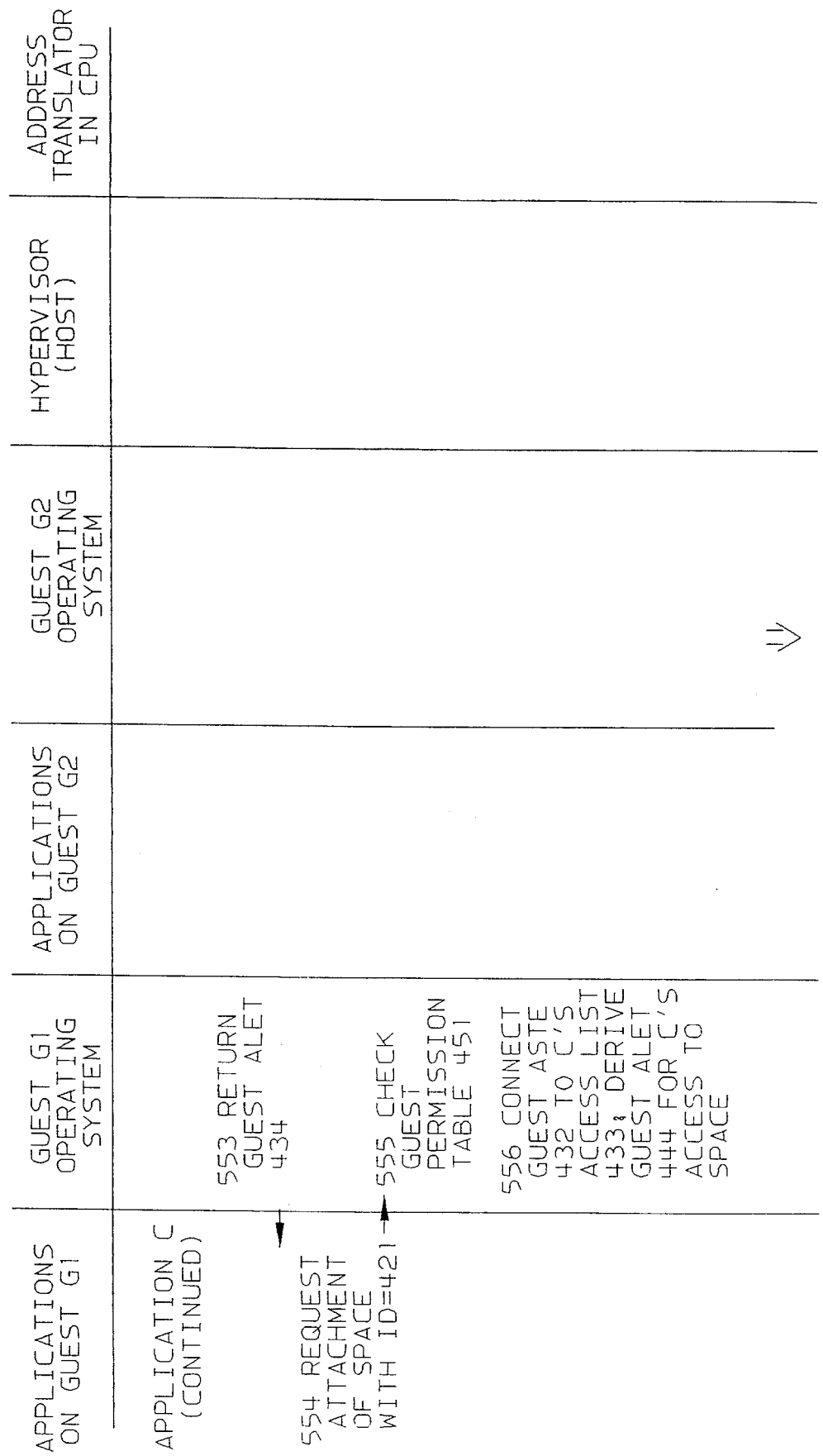

TO FIG. 5(k)

ALLOCATION OF ADDRESS SPACES WITHIN VIRTUAL MACHINE COMPUTE SYSTEM

BACKGROUND OF THE PRESENT INVENTION

The invention relates generally to computer systems and deals more particularly with allocation of address spaces within a storage.

An application program executing in a computer system often makes requests to access storage, for example to read or write data. The request usually includes a specific address. In response, the operating system must determine a suitable location to which to write or the precise location of the data to be read. There are several aspects to this determination. First, the address provided in the request may have fewer or more bits than required to uniquely identify any one location in storage. In the former case, the operating system may need to select or identify a smaller address space or region within the storage having a size which corresponds to the number of bits in the address provided by the request. Such an address space can be used to store related data required by the application which made the request. Other address spaces can be selected for other applications and, in such a case, identical addresses specified by two applications may correspond to different storage locations. Second, an address space may be dedicated to one application or shared between two or more applications. Third, in a computer system having more than one logical operating system, more than one of the operating systems may need to control the location of the address space allocated for an application program.

A previously known IBM ES/9000 computer system can execute an IBM VM/ESA (R) operating system which includes a hypervisor or host program. The host creates a multiplicity of virtual machines which each comprise a separate guest operating system. Each guest appears to the user as a separate computer and executes application programs that require storage. Each guest controls which address space or spaces its applications can access and provides a corresponding access list entry token (ALET) to the application upon request. The application returns the ALET with a subsequent storage access request and the machine translates the ALET by access register translation ("ART") into a segment table designation (STD) using tables defined by the guest. The STD corresponds to the address space in which the referenced address resides. Then, the machine, according to guest-defined tables, performs dynamic address translation ("DAT") using the STD and operand address as inputs to yield a guest real address. Then, the machine performs prefixing on the guest real address to yield a guest absolute address. The "guest absolute address" is the address determined after final translation by the guest. ART and DAT in a guest operating system are described in a publication entitled "ESA/390 Interpretive-Execution Architecture, Foundation for VM/ESA" by D. L. Osisek et al. in *IBM Systems Journal,* Volume 39, No. 1, pages 34–51 (1991). Also, a publication entitled "ESA/390 Principles of Operation" which is available from International Business Machines Corporation at Mechanicsburg, Pa. by order #SA22-7201 describes prefixing, ART and DAT in detail but not in a guest operating system. ART in a non-guest operating system is also described in U.S. Pat. No. 4,979,098 and a publication entitled "Concepts of Enterprise Systems Architecture/370" by K. E. Plambeck in *IBM Systems Journal* volume 28, No. 1 pages 39–61 (1989).

Next, the machine, according to host specification of the guest type, performs "virtual= real or absolute" ("V=R"), "virtual= fixed" ("V=F") or "virtual= virtual" ("V=V") address translation, where "V" on the left side of each equation refers to the guest absolute address resulting from the guest DAT and prefixing. For V=R translation, the host assigns the guest absolute addresses to the lowest address range of the storage. For V=F translation, the host assigns the guest absolute addresses to an address space beginning at a predetermined and constant offset. For V=V translation, the host assigns the guest absolute addresses to a variable address space and can page-out the stored data to auxiliary storage such as external DASD when not in use. (When needed, the host pages-in the stored data.)

U.S. Pat. Nos. 4,456,954 and 4,695,950, a publication entitled "System/370 Extended Architecture: Facilities for Virtual Machines" by P. H. Gum published in *IBM Journal Research and Development,* Volume 27, No. 6, pages 530–543 (1983), a publication entitled "IBM System/370 Extended Architecture Interpretive Execution" which is available from International Business Machines Corporation at Mechanicsburg, Pa. by order number SA22-7095, and a publication entitled "Multiple Operating Systems On One Processor Complex" by T. L. Borden et al., published in *IBM Systems Journal,* Volume 28, No. 1, pages 104–123 (1989), teach the implementation of a hypervisor and supporting hardware which allow the DAT and ART processes to proceed at guest level within guest absolute storage. The guest absolute storage is defined by the host program as either a fixed region of host absolute storage (V=R, V=F) or a host-managed virtual address space (V=V). This allows a guest program to create its own address spaces, which may then be shared among applications executing under the same guest, just as they could be if the guest program were executing directly on the processor complex. Note that each guest's access is limited to one host virtual address space, which contains all guest absolute storage. No access to other host spaces is possible.

U.S. Pat. No. 5,230,069 and the publication entitled "ESA/390 Interpretive-Execution Architecture, Foundation for VM/ESA" published in *IBM Systems Journal* Volume 30, No. 1 (1991) disclose another type of guest called "MCDS". An MCDS guest is a V=V guest for which no ART or DAT translations are permitted at guest level; however, ALETs may be used by guest programs. The ALETs are translated at host level (i.e., through host address translation structures) to select a host address space, which is then input to host DAT. This allows the V=V guest programs to access multiple dedicated and shared host address spaces, subject to authorization controls established by the host. However, such a guest must sacrifice the guest-level address translation. Consequently, full function guest operating systems such as MVS/ESA and VSE/ESA which depend on the translation and related capabilities cannot take advantage of MCDS function. Also, there is no means for the guest operating system to restrict access to the available host spaces to a subset of the applications running under the guest because the application may use any ALET of its choice without intervention from the guest operating system. Also, the additional spaces accessible under MCDS may contain data only; they cannot be a source for execution of program instructions. Finally, the MCDS prior art does not support V=R or V=F guests, and consequently, the V=R and V=F guests cannot access dedicated or shared host-virtual address spaces.

Accordingly, an object of the present invention is to provide an address space allocation process within a virtual machine environment which permits more than one guest/ virtual machine to share a single address space and each central access by its applications to the shared address space.

Another object of the present invention is to provide a virtual machine computer system which permits applications executing under a single guest to readily access both guest-managed and host-managed address spaces.

Another object of the present invention is to provide a virtual machine computer system which permits V=R and V=F guests to share an address space.

Another object of the present invention is to allow a guest to use multiple host-managed address spaces as a source for instructions as well as data.

SUMMARY OF THE INVENTION

The invention resides in a virtual machine computer system which permits more than one guest/virtual machine to share a single address space and each control access by its applications to the shared address space. The computer system comprises a host operating system for creating first and second virtual machine guests. The first guest responds to a request from a first application executing in the first guest to allocate an address space, by determining at least in part a storage region for the address space. The first guest also responds to a request from the first application to grant shared access by a second application executing in the second guest to the address space, by notifying the host operating system that the second guest or the second application is authorized to access the address space. The second guest responds to a request from the second application to access the address space, by determining whether the second application has authority to access the address space. In the preferred embodiment of the invention, the host operating system also participates in determining a storage region for the address space.

According to another feature of the present invention, a guest and host both participate in the authorization and address translation process for a host managed address space.

BRIEF DESCRIPTION OF THE FIGURES

FIG. 1(*b*) is a block diagram illustrating other components and operating environment of the present invention.

DETAILED DESCRIPTION OF THE PREFERRED EMBODIMENTS

Figure 1A:
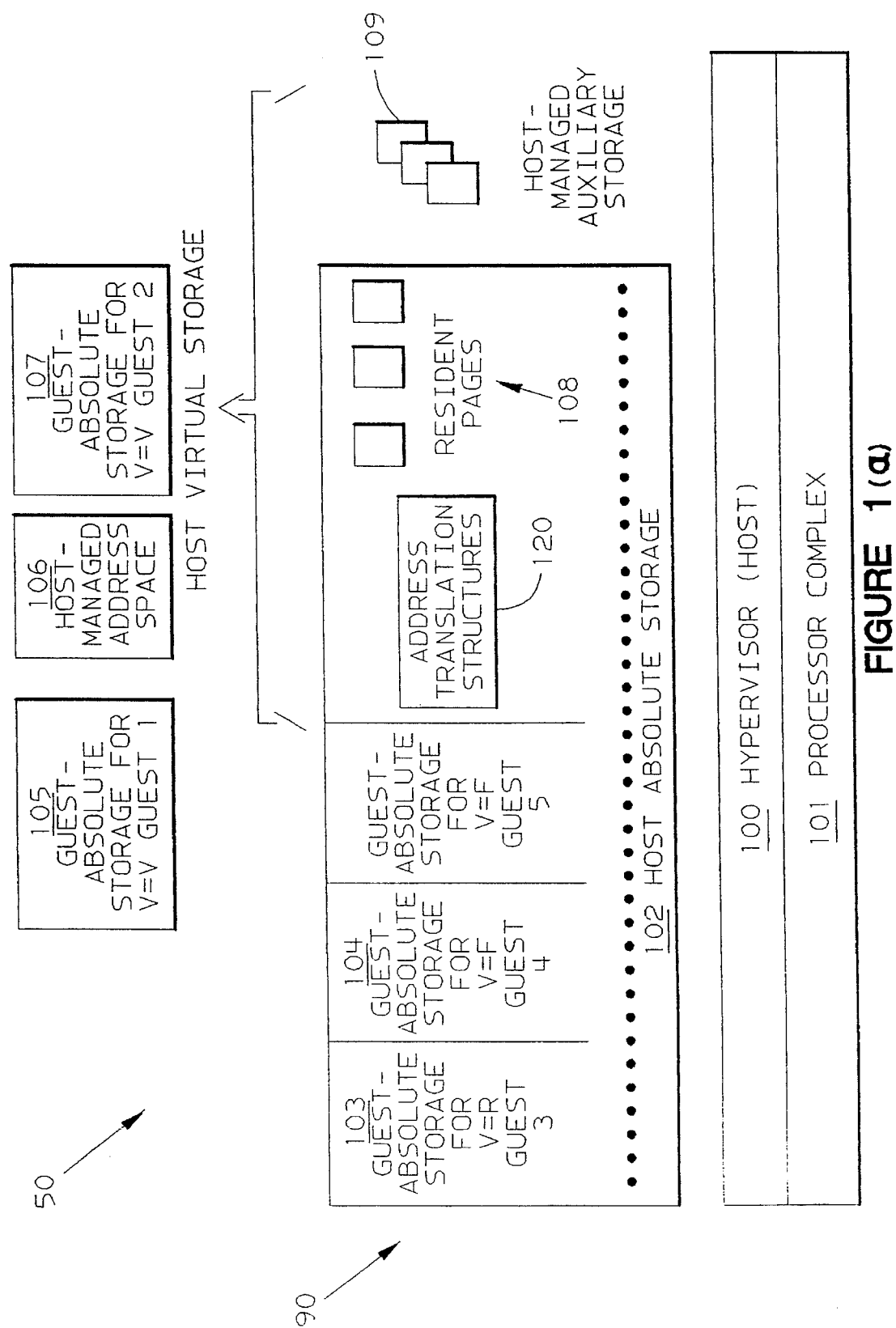
FIG. 1(*a*) is a block diagram illustrating components and operating environment of a computer system according to the present invention.

Referring now to the drawings in detail wherein like reference numbers indicate like elements throughout the several views, FIG. 1(A) illustrates components of a computer system generally designated 50 according to the present invention. System 50 comprises a processor complex 101, main storage 90 (which can be part of the processor complex 101) and a virtual-machine hypervisor program 100 (also called a host) executing on the processor complex 101. The main storage 90 includes host absolute storage 102 which is managed by host 100. Host 100 can address the absolute storage 102 using an absolute addressing scheme which associates a fixed address with each storage location, without any virtual-address translation or other transformation. The host creates a multiplicity of virtual machines, which are software simulations of processor complexes and are accessed via terminals (not shown). Within each virtual machine, a separate operating system (or separate instance of an operating system) can run as a "guest" and control execution of and certain aspects of address space allocation for one or more applications.

FIG. 1(B) shows address spaces 111–113 which are all managed by a single guest. Storage 110 is viewed by the guest as absolute storage and contains address-translation structures defining guest-managed address spaces (i.e., guest virtual storage). As at host level, these structures map each guest virtual page either to a guest-absolute storage frame or to a location in guest-managed auxiliary storage 115. These guest address spaces include the primary spaces 111 and 113 containing application programs X and Y, respectively, and an additional address space 112 which can be shared between application programs X and Y within the same guest.

In addition to the foregoing guest managed storage, the host may create other virtual storage address spaces such as 106 (FIG. 1*a*) that the host manages for its own use or for use by one or more guests. Because these other virtual storage address spaces exist at host level, i.e. the translation tables and residency are controlled by the host, they can be made accessible to multiple guests according to the present invention.

An application executing in one of the guests can select in a storage allocation (or "creation and attachment") request a dedicated or shared guest managed storage allocation or a dedicated or shared host managed storage allocation. Host-managed address spaces are usable by guest applications in every way that a guest-managed address space is usable, and are additionally able to be shared among applications in different guests. Because the translation process for access to host-managed spaces first passes through a guest control and translation phase, the guest can control which of its applications have access to particular host address spaces while preserving host control and translation as well.

To begin the address space allocation process of system 50 (to allocate a new address space or grant access to an existing address space), an application requests from the guest an address space identifier and access list entry token (ALET) to reference the address space. In response, the guest verifies the application's authority to create or access the space. If the application is authorized, the guest assigns a guest ALET for the application to use in referring to the space, updates translation tables to map this ALET to the designation for the space, and returns the ALET to the application. Because the guest is called upon to initially provide the ALET to the application program and because the machine, given an ALET by the application program, consults the guest-managed translation tables to identify the corresponding space and verify authority, the guest controls which address spaces the application can access. The guest's choice may be based on an authorization level associated with the application.

A guest can provide different ALETs to different applications executing in the guest which, ALETs refer to the same, shared, guest managed address space. Each application must use the ALET assigned to it to address the shared address space.

FIG. 5 illustrates an example of this process. Application A executing on Guest 1 requests an address space identifier and an ALET for a guest managed address space ABLE (step 500). In response, Guest 1 builds a guest DAT table 410, STD 415, and ASTE 412 and assigns an address identifier 411 (step 501). Next, Guest 1 connects a guest ASTE 412 to application A's access list 413, and derives a guest ALET 414 for application A's access to address space ABLE (step 502). Next, Guest 1 returns the address space identifier 411 and ALET 414 for address space ABLE to application A (step 503). At this point all of the data structures have been defined to permit application A to access address space ABLE.

FIG. 5 also illustrates that application A executing on Guest 1 instructs the Guest 1 operating system to permit application "C" to access address space ABLE (step 504). In response, Guest 1 updates a guest permission table 451 accordingly (Step 505). Later, application A sends the address space identifier for address space ABLE to application C (step 509.5). Subsequently, application C executing on Guest 1 requests an ALET (using the address space identifier obtained from application A) for address space ABLE (step 550). In response, Guest 1 checks the permission table 451 for address space ABLE and learns that application C is authorized (step 551). Next, Guest 1 connects the guest ASTE 412 to application C's access list 433, and derives a guest ALET 434 for application C's access to address space ABLE (step 552). Next, Guest 1 returns the ALET for address space ABLE to application C (step 553). At this time, all the data structures have been defined to permit application C to access address space ABLE.

FIG. 5 also illustrates a request by application B executing on Guest 2 for an address space identifier and ALET for a host managed address space BAKER (step 510). In response, Guest 2 builds a guest ASTE 422 (step 511) and requests the host to create a host address space (step 512). In response, the host builds DAT tables 420, STD 429, and ASTE 426 and assigns an address space identifier 421 (step 513). Next, the host connects host ASTE 426 to Guest 2's access list 427, and derives a host ALET 428 for Guest 2's access to address space BAKER (step 514). Next, the host returns the address space identifier 421 and ALET 428 for address space BAKER to Guest 2 (step 515). Then, Guest 2 places the host ALET 428 into a new format guest STD 425 within guest ASTE 422 (step 516). Then, Guest 2 connects guest ASTE 422 to application B's access list 423 and derives a guest ALET 424 corresponding to address space BAKER (Step 517). Next, Guest 2 returns the address space identifier 421 and ALET 424 to application B (step 518). At this point all of the data structures have been defined to permit application B to access address space BAKER.

As described above in steps 500–503 and 510–518, the address space identifier was returned to the application by the guest which executes the application in the cases where the application originally requested creation of and attachment to the address space. As described above in step 509.5, the address space identifier for address space ABLE was passed from application A executing on Guest 1 to application C executing on Guest 1 in the case where application A originally requested creation of and attachment to address space ABLE. If an application C executing on Guest 1 wants to access host managed address space BAKER which was initially created for and attached to application B executing on Guest 2, application C and Guest 1 will not originally have the address space identifier or ALET for address space BAKER or permission to access address space BAKER. Thus, the following steps precede the access by application C to address space BAKER. Application B notifies Guest 2 that Application C should be given permission to access address space BAKER (step 530). In response, Guest 2 determines from the host that application C is executing on Guest 1 (step 531). Next, Guest 2 notifies the host that Guest 1 should be given access to address space BAKER having address space identifier 421 (step 532). In response, the host updates a permission table 450 (FIG. 4) and returns an acknowledgement to Guest 2 (step 533). Next, Guest 2 notifies Guest 1 that application C is permitted to access address space BAKER using address identifier 421 (step 534). Next, Guest 1 requests from the host an ALET which corresponds to address space BAKER (step 535). In response, the host confirms from permission table 450 that Guest 1 is authorized to access address space BAKER indicated by address identifier 421 (step 536). Then, the host adds host ASTE 426 to Guest 1's access list 417 and derives the host ALET 438 corresponding to address space BAKER (step 537) and returns the ALET to Guest 1 (step 538). Next, Guest 1 builds the guest ASTE 432 for address space BAKER and places the host ALET 438 corresponding to address space BAKER into the new format STD 435 within the ASTE (step 539). Next, Guest 1 updates its permission table 451 (FIG. 4) to indicate that application C has authority to access address space BAKER indicated by address identifier (step 540) and returns an acknowledgement to Guest 2 (step 541). Guest 2 then returns control to application B indicating completion of the permission request (step 542). Next, application B notifies application C of the address space identifier 421 for address space BAKER (step 543). Subsequently, application C requests the ALET for address space BAKER by providing the address space identifier 421 to Guest 1 (step 554). In response, Guest 1 determines from its permission table that application C is authorized to access address space BAKER (step 555), connects the guest ASTE 432 to application C's access list 433 and derives the guest ALET 444 which corresponds to address space BAKER (step 556). Then, Guest 1 returns the ALET for address space BAKER to application C (step 557). In an alternate embodiment of the present invention, Guest 2, host and Guest 1 may have the right to veto the shared access to address space BAKER by application C in steps 532, 533 and 540, respectively. At this point all of the data structures have been defined to permit application C to access address space BAKER.

Two or more guests can provide different guest ALETs to their respective applications, which ALETs refer to the same, shared, host managed address space. For such a host managed address space, the host can also provide different host ALETs to the different guests to correspond to the same, shared address space. Each application and guest must use the ALET assigned to it to access the shared address space.

Figure 3:
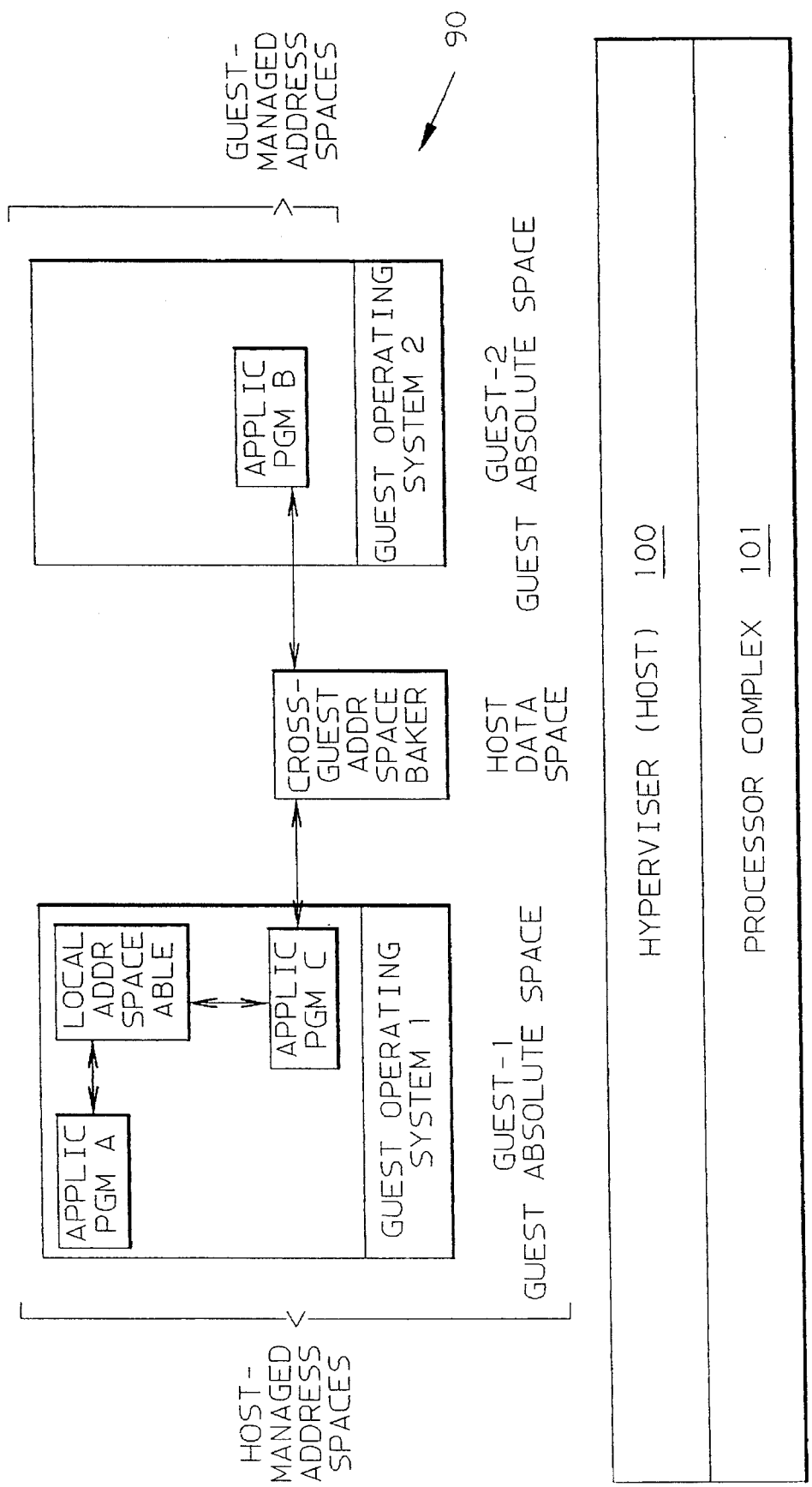
FIG. 3 is a block diagram illustrating an example of guests, application programs and shared and dedicated storage that are supported by the process of FIG. 2.

FIG. 3 illustrates the shared address spaces that result from the allocations described above in the example of FIG. 5. Guest 1 executes application programs A and C as well as manage guest-managed data space named ABLE, which is shared between applications A and C. Guest 2 executes application program B. Application B requested creation of a host managed address space BAKER, and has arranged to share that space with application C on Guest 1 (by forwarding the address space identifier any by instructing the guest and host to permit that sharing so that application C's request on that space identifier will be honored). Application C thus has simultaneous access to both a guest managed space ABLE and a host managed space BAKER.

Figure 4A:
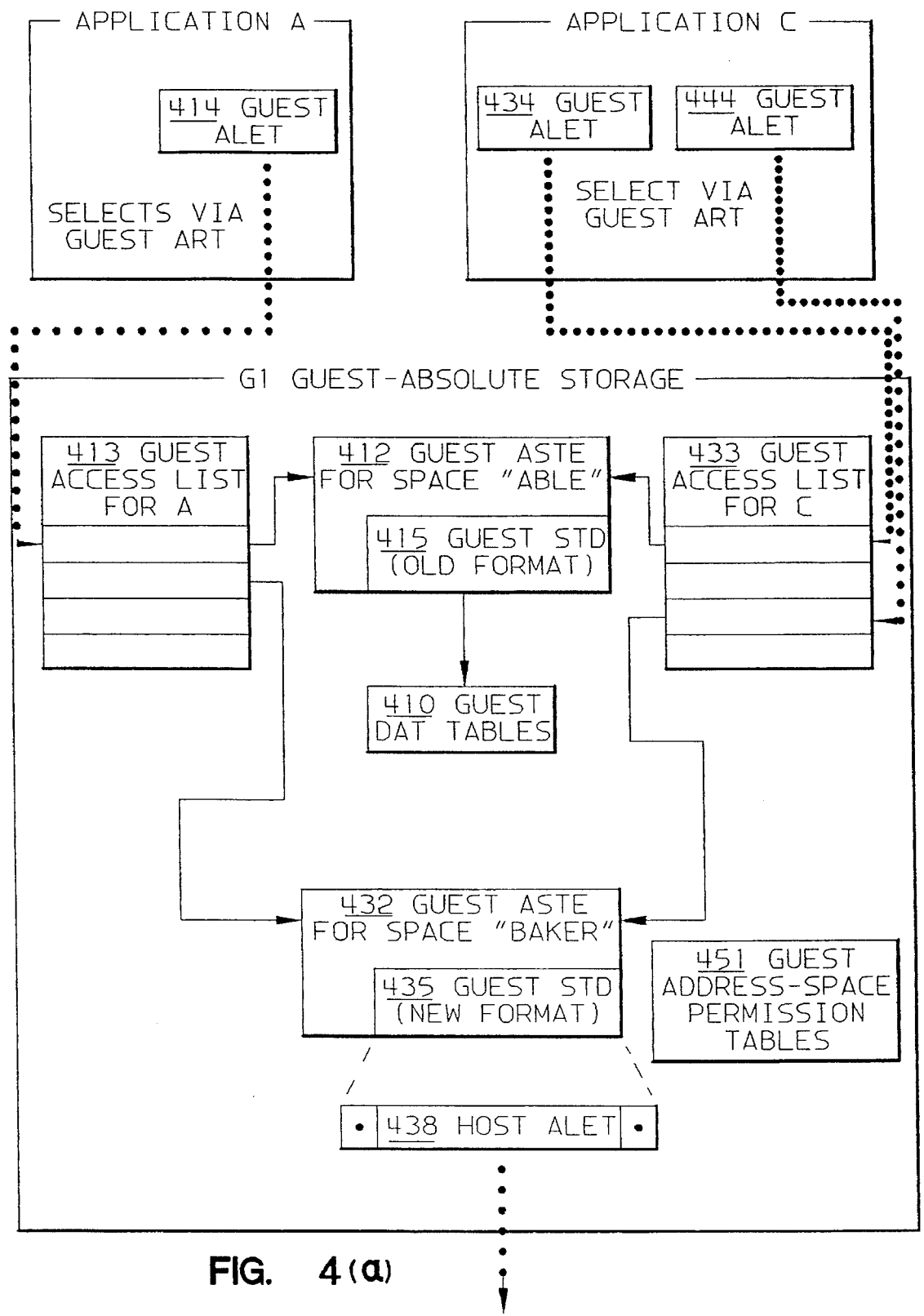
FIG. 4 is a block diagram illustrating address translation structures required to support the example of FIG. 3.
Figure 4B:
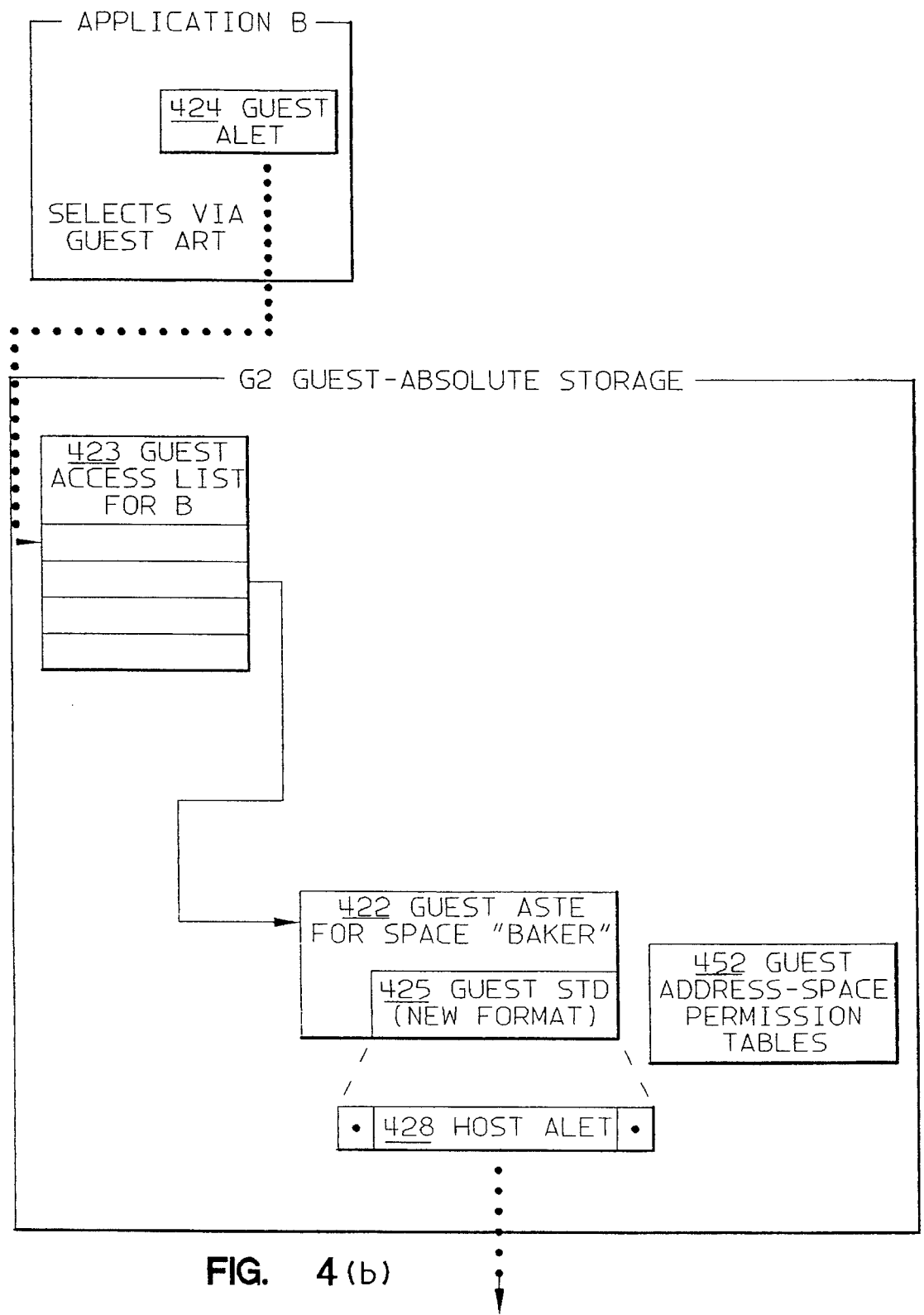
Figure 4C:
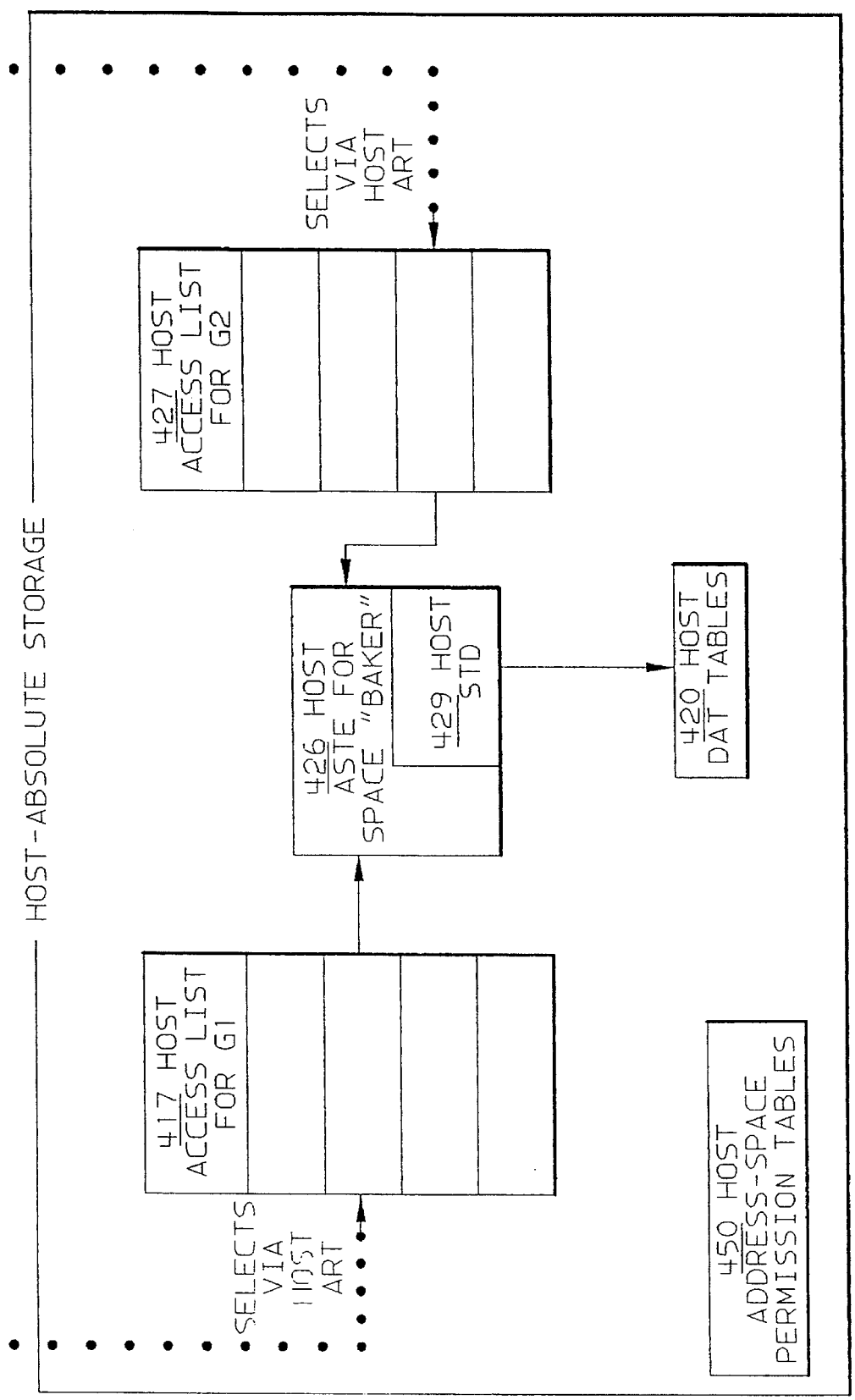
Figure 5F:
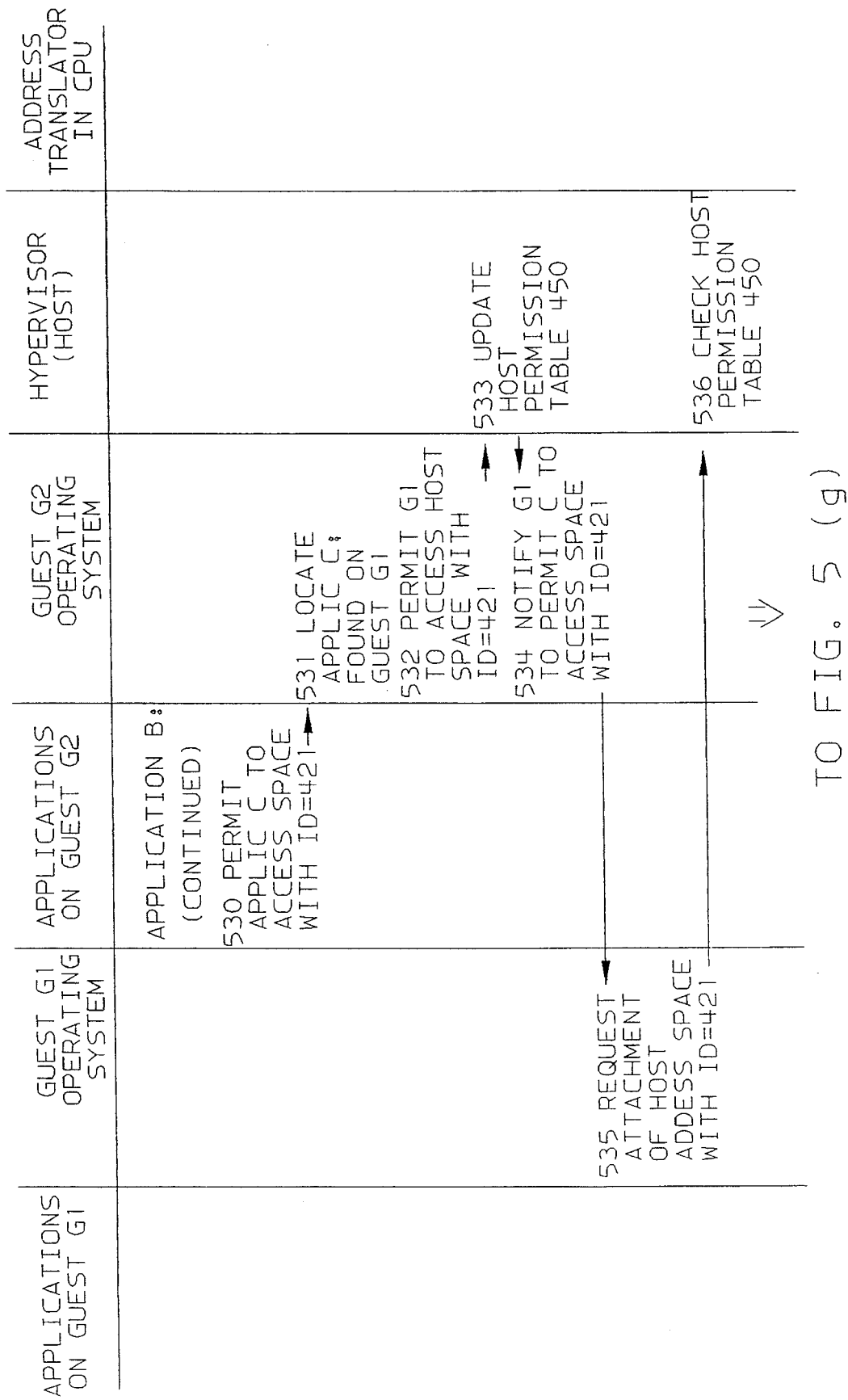
FIG. 5 is a flow chart illustrating in detail an address space allocation process including creation of the address translation structures of FIG. 4 and use of the process of FIG. 2 as applied to the example of FIG. 3.
Figure 5H:
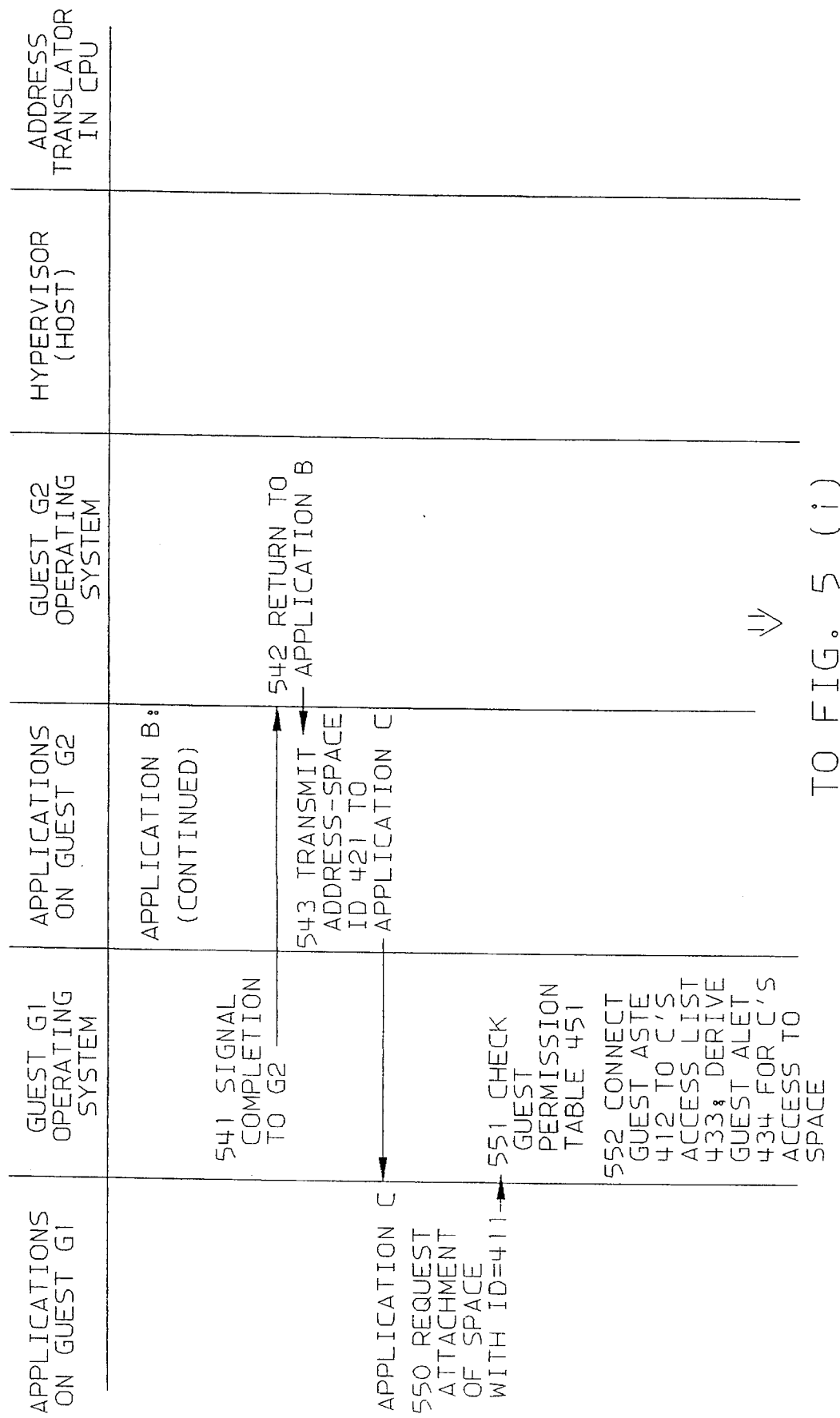
Figure 5J:
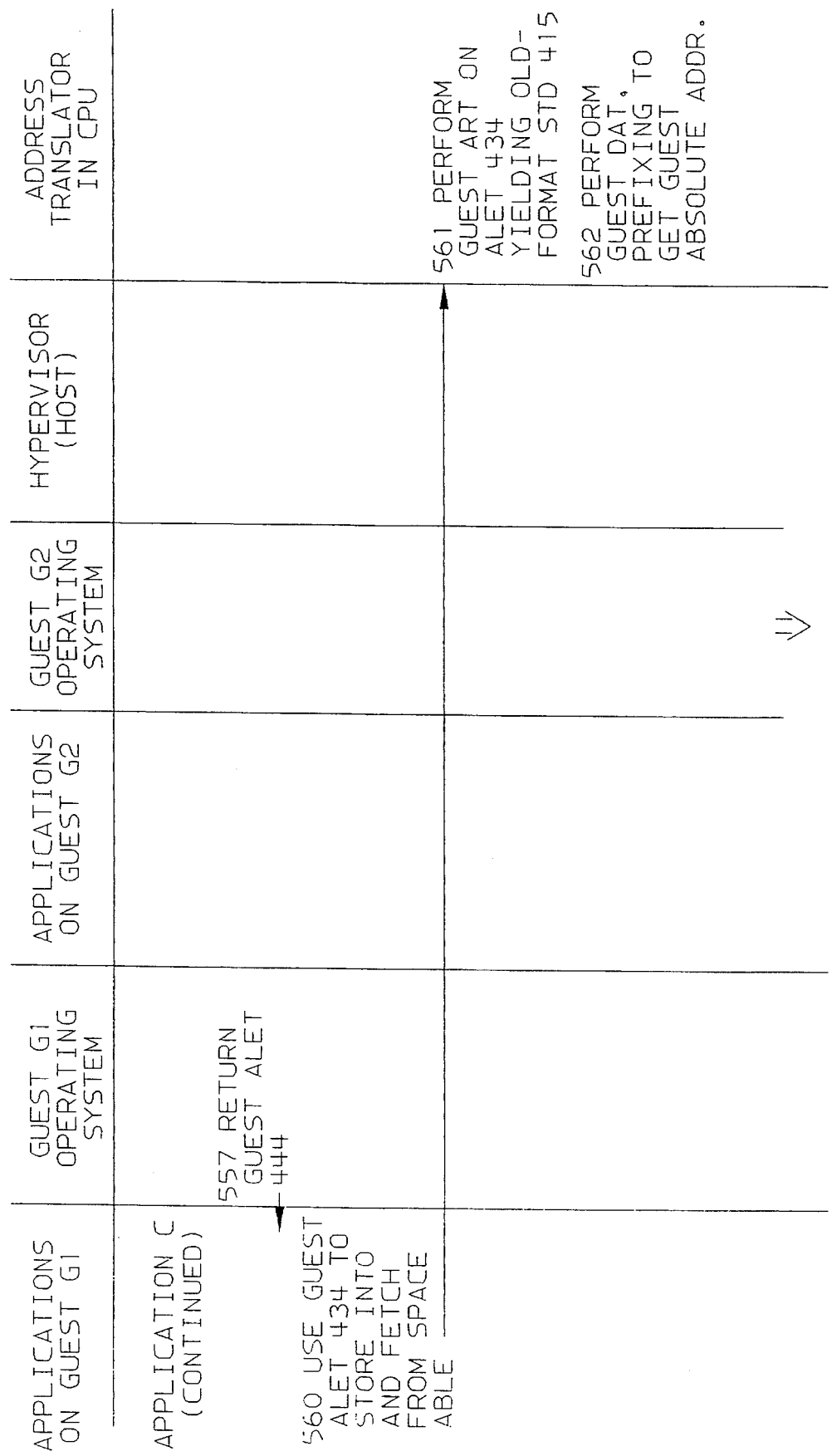
Figure 5K:
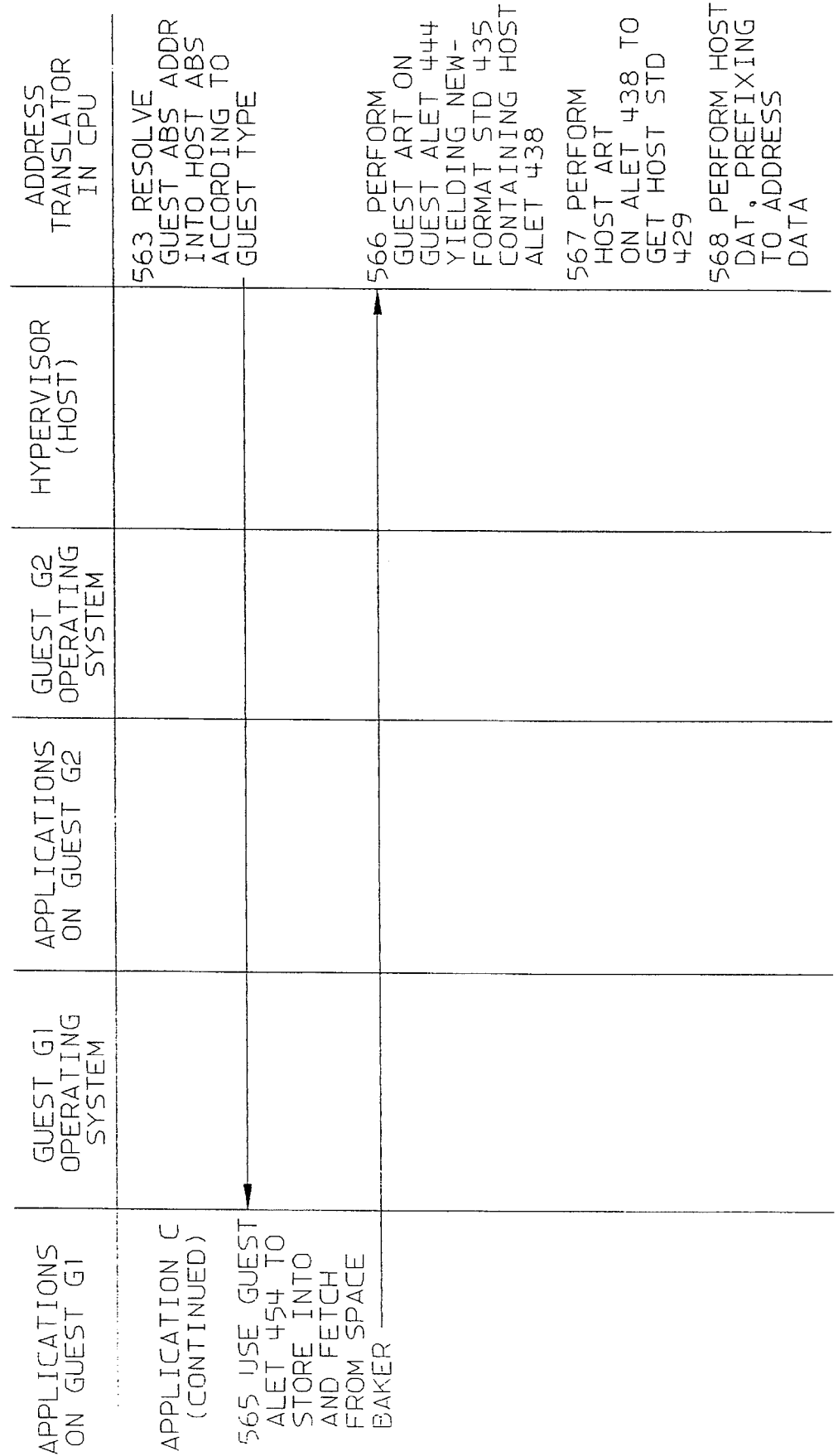

FIG. 4 illustrates the corresponding address translation structures described above in the example of FIG. 5. The translation structures in host absolute storage include one host access list (417,427) per guest. An entry in a host access list points to a host ASTE (426 for space "BAKER") which in turn contains a host STD 429 designating the host DAT tables 420 which map the selected host address space. The translation structures in a guest absolute storage include one guest access list 413, 423, and 433 per application program A, B and C, respectively. An entry in a guest access list points to a guest ASTE (412 for space "ABLE", 422 and 432 for space "BAKER") which in turn contains a guest STD. If the selected address space is a guest-managed space, the guest STD will be an old format STD (415) designating the guest DAT tables (410) which map the space. If the selected address space is a host-managed space, the guest STD will be a new format STD (425,435) which has the relevant portions of a host ALET imbedded in it. The host ALET (428,438) which the hardware translator constructs from the new format STD will be used to select the host access-list entry designating the target space. Finally, the guest operating systems will provide a guest ALET (414, 424, 434, 444) to an application program whenever an address space (host managed or guest managed) is added to that application's access list; the application program can load that ALET into an access register in order to make reference to storage in the corresponding address space. The host and each guest also maintain the permission tables (450, 451, 452) indicating which guests or applications are permitted to connect to which address spaces. FIG. 4 shows these permission tables in absolute storage; in an alternate embodiment they may instead be in virtual storage.

Figure 2:
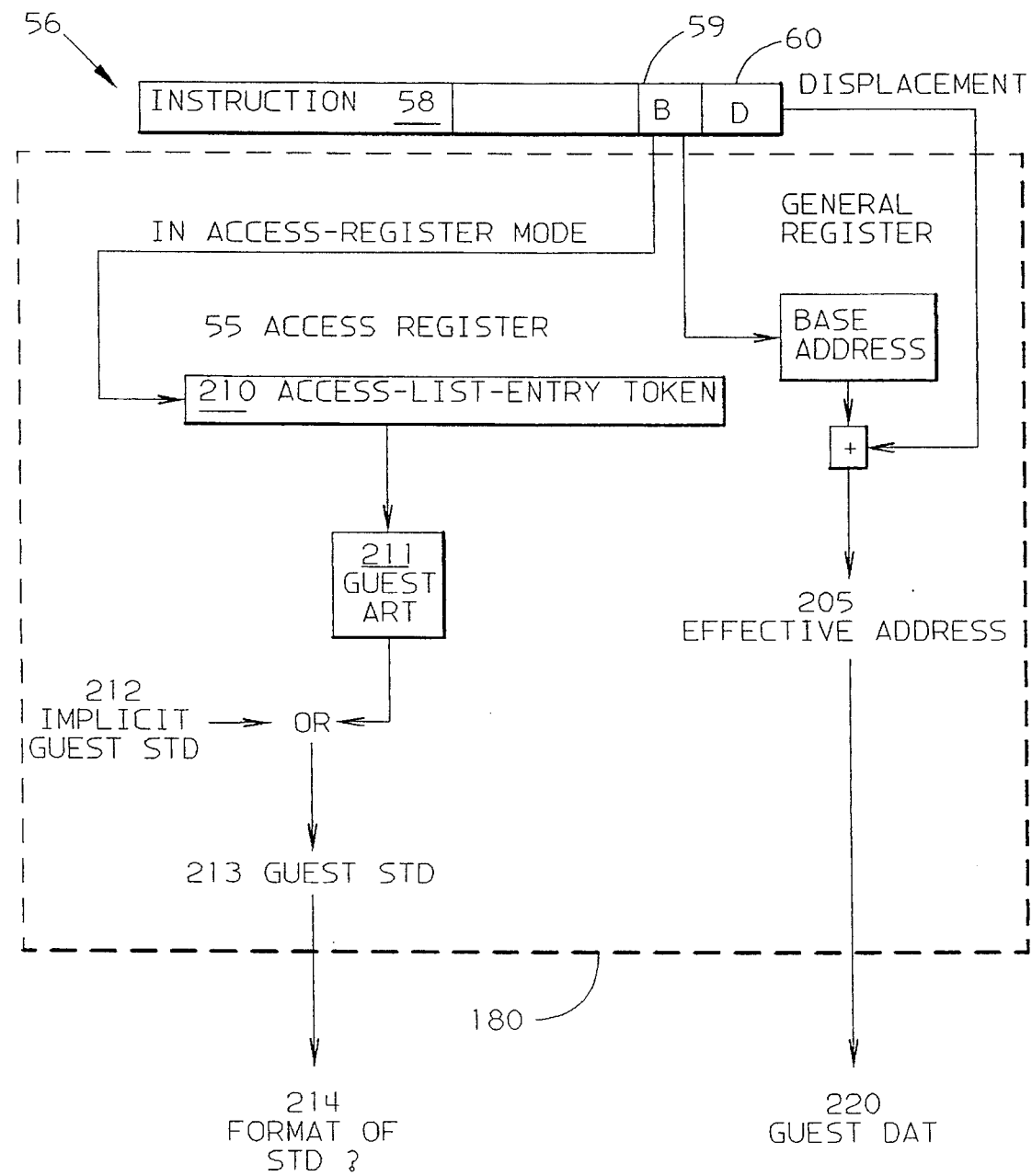
FIG. 2 is a comprehensive flow chart illustrating address translation of the present invention within the environment of FIGS. 1 and 2.
Figure 2B:
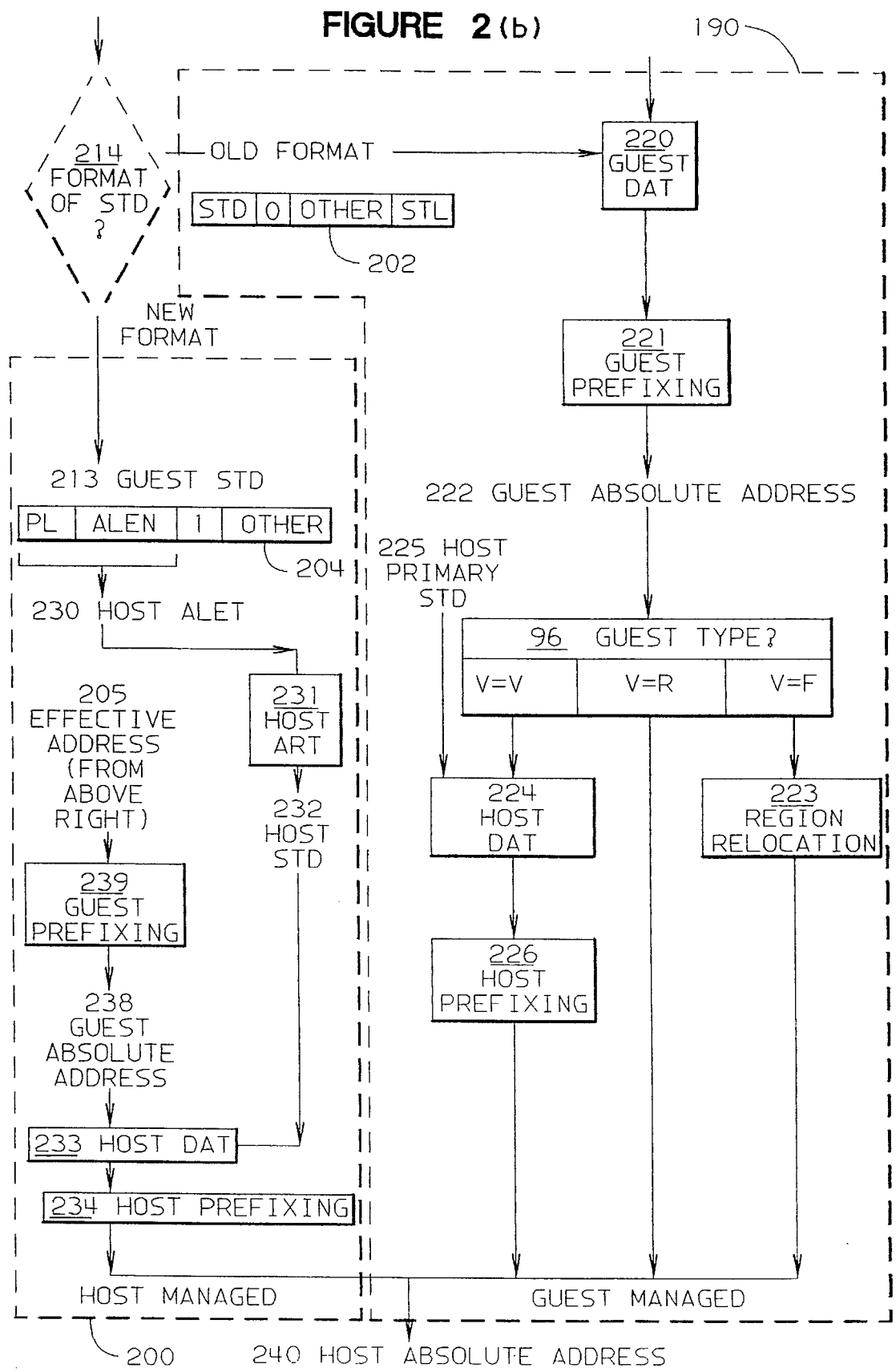

After the foregoing data structures have been defined, applications A, B and C can make storage access requests 56 as illustrated in FIG. 2. In FIG. 5, application A makes such a read or write request for address space ABLE in step 506. Application C makes such a read or write request for address space ABLE in step 560 and for address space BAKER in step 565. Application B makes such a read or write request for address space BAKER in step 519.

In the example illustrated in FIG. 2, the storage access request 56 comprises an instruction 58 such as read or write (fetch or store), a base 59 and a displacement 61. The sum of the contents of a general register indicated by base 59 and a value stored in displacement 61 is an "effective address" 205. The effective address is the application's view as to the specific storage location within the address space.

The following describes the actual translations performed by hardware of system 50 also called the "machine" pursuant to such a storage access request by an application. These translations use the foregoing data structures defined by the guests and host. The address translation process of FIG. 2 comprises an initial guest translation subprocess 180 according to the prior art, a guest managed storage translation subprocess 190 according to the prior art, and a host managed storage translation subprocess 200 according to the present invention. (The combination of these subprocesses is also part of the present invention.) In the illustrated embodiment, the storage access request is in access-register mode and the location of the access register 55 is provided by the base "B" field of the request. At step 211, guest access-register translation (ART) is performed on ALET 210. Guest ART involves looking up the ALET in guest translation structures 119 (called the access list and the ASN-second-table entry (ASTE)) to determine a corresponding guest segment-table designation (STD) 213. This result (and the result of Host ART 231 described below) can be stored in a translation look-aside buffer (not shown) to expedite future storage access requests to the same address space. The ART process is described in a document entitled "ESA/390 Principles of Operation" which is available from International Business Machines Corporation at Mechanicsburg, Pa. by order #SA22-7201 and hereby incorporated by reference as part of the present disclosure.

Alternatively, some storage references (such as instruction fetches) are defined to use control-register contents 212 implicitly as the source of the STD. In these cases, the guest ART process is bypassed, and the operation begins here with the implicitly selected STD 212 used as STD 213.

In either case, the translation process has now derived a prior art guest STD except that the STD includes a control field to select guest managed storage or host managed storage. Next, according to the present invention, the machine reads the control field to determine if the STD indicates guest managed storage or host managed storage (decision 214). The STD for guest managed storage, distinguished by a zero in the control field, is in "old format" 202 (and handled by the guest managed translation subprocess 190 of the prior art) and the STD for the host managed steerage, marked by a one in the control field, is in "new format" 204 (and handled by the host managed translation subprocess 200 of the present invention).

The old format 202 comprises a control field with the value zero, a segment table origin (STO) field, a segment table length (STL) field, and other prior art controls (space-switch control, storage alteration event control, and private space control) which are not relevant to the present invention. If the STD has old-format, the machine uses the STD to identify the particular table 119 and performs guest DAT 220 according to the table to translate the effective address 205 of the storage operand. This result (and the result of Host DAT 233 and 224 described below) can be stored in a translation look-aside buffer (not shown) to expedite future storage access requests to the same location. Guest prefixing 221 is applied to the result, to derive a guest absolute address 222. (Prefixing is required in a multiprocessor computer system to adjust certain addresses used by the different processors so they do not overlap one another during processing).

The next step in the guest managed subprocess 190 of FIG. 2 is to determine the type of guest which is executing the requesting application (step 96). The type of guest was defined at time of creation of the guest, was recorded in an interpretive execution state description (not shown), and indicates the type or absence of address space translation subsequently required by the machine to access the working storage of the guest. In the following prior art descriptions of three guest types, the addresses provided by the guests are called "V" for "virtual" addresses because further translation may be required by the machine to yield a host absolute address. (However, in FIG. 2, these same "virtual" addresses are called "guest absolute addresses" because they represent the final translation performed by the guest.)

Figure 1:
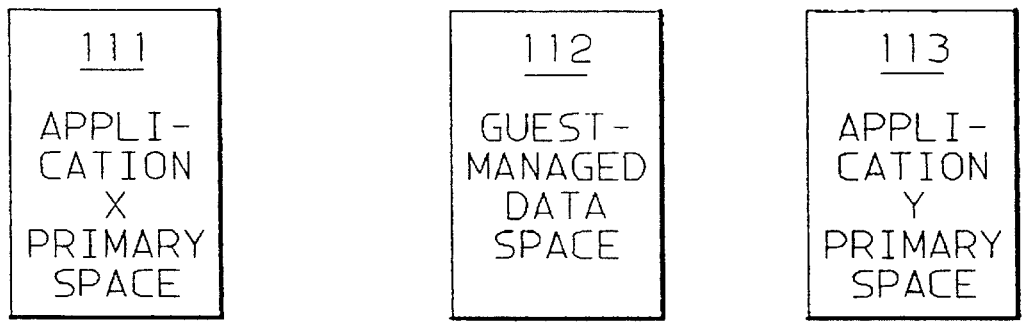
Figure 1:
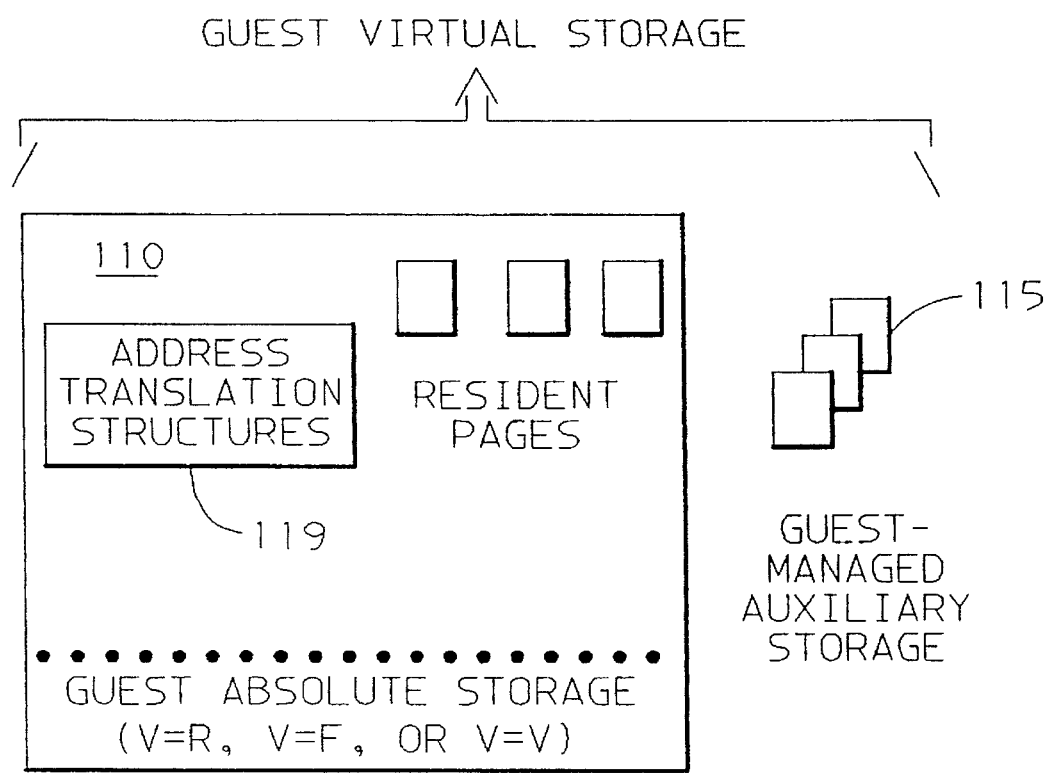

1. V=R ("Virtual=Real or absolute") guest's storage 103 (FIG. 1) is assigned from the lowest address range of host absolute storage, beginning at address 0, and has a length L. This storage is dedicated to this use for the life of the guest. Thus, any V=R guest absolute address X ($0 \leq X < L$) maps to host absolute address X. There can be only one V=R guest.

2. V=F ("Virtual=Fixed") guest's storage 104 is also dedicated, beginning at some offset F into host absolute storage, and has a length L. The V=F guest absolute address X (0≦X<L) maps to host absolute address X+F. Several V=F guests may coexist with each other and with a V=R guest, provided that F and L values are chosen for each to avoid overlap.

3. V=V ("Virtual=Virtual") guest's storage 105 is not assigned to constant host absolute storage locations as in V=R and V=F. Rather, the host creates a virtual-storage address space (105, 107) for the guest's storage. The guest's storage is paged between available storage frames 108 within host absolute storage 102 and host-managed auxiliary storage such as magnetic disk 109. Any number of "V=V" guests can be supported. For each V=V guest, the host maintains address translation structures 120 in its absolute storage to define the mapping of each guest address to either a frame of host absolute storage if the containing page is resident, or else to a location in auxiliary storage. As is well known in the art, the processor interprets the address translation structures through a process called Dynamic Address Translation (DAT) to locate a resident guest page. If the processor encounters a reference to a non-resident page, the processor signals the host to resolve the page fault; the host then reads the page from auxiliary storage into main storage to form a new resident page, updates the address translation structures, and redispatches the guest to continue execution.

Thus, the guest absolute address 222 is translated into or equated with a host absolute address 240 in a manner which depends on the guest type: For a V=R guest, the guest absolute address 222 is equated to the host absolute address (i.e. without change). For a V=F guest, a region relocation step 223 adds the zone origin or offset ("F" in the explanation of V=F above) to yield the host absolute address 240. For a V=V guest, host DAT 224 is performed, using the host primary STD 225 to identify the host-virtual address space containing guest-absolute storage; then host prefixing 226 is applied to the result to yield the host absolute address 240. Subprocesses 180 and 190 for the old style STD and access by applications A and C to guest managed address space ABLE are also illustrated by steps 506–509 and 560–563, respectively of FIG. 5.

Thus, when application C wishes to reference space "ABLE", application program C uses guest ALET 434. The system performs guest ART on ALET 434 to locate an entry in guest access list 433, which entry points to guest ASTE 412 containing the old format guest STD 415. The system then continues according to the prior art subprocess 190, performing guest DAT using guest STD 415, and then guest prefixing to yield the guest absolute address of the target location. Finally, the machine resolves this guest absolute address into a host absolute address according to the guest type (V=R, V=F, or V=V).

The new-format STD differs from the old-format STD in that the control field contains the value 1, and the segment-table origin and segment-table length fields are omitted, and are replaced by a primary-list bit (PL) and an access-list-entry number (ALEN). (The PL and ALEN fields have the same meanings as they do in the ALET of the prior art; PL selects between the primary-space and dispatchable-unit access lists, and ALEN is the index into the access list.) The other fields of the new format STD are the same as those of the old-format STD. Referring again to decision 214, if the control field of STD 213 indicates host managed storage, then it is handled as follows. The machine effectively forms an ALET 230 containing these same values of PL and ALEN, with zeros in all other bit positions. Then, host ART 231 translates the effective host ALET 230 using a host access list and a host ASTE within the address translation structure 120, into a host STD 232. This host STD 232 identifies the host address space containing the storage operand. A guest prefixing operation 239 is performed on the effective address 205 of the storage operand, to obtain the guest absolute address 238 of the storage operand. The host STD 232 is used in the host DAT process 233 to translate the guest absolute address 238 of the storage operand. Host prefixing 234 is applied to the result, yielding a host absolute address 240. Also, a bit in the host STD can suppress application of guest prefixing at step 239; this capability is disclosed in U.S. Pat. No. 5,230,069, which is hereby incorporated by reference as part of the present disclosure. The foregoing subprocesses 180 and 200 for the new style STD and access by applications B and C to host managed address space BAKER are also illustrated by steps 519–522 and 565–568, respectively of FIG. 5.

Thus, when application program C wishes to reference address space "BAKER", application program C uses ALET 444. The system performs guest ART on ALET 444 to locate an entry in guest access list 433, which entry points to guest ASTE 432 containing the new format guest STD 435. The machine extracts data from guest STD 435 to form a host ALET 438, and then performs host ART on host ALET 438 to select the entry in host access list 417 which points to host ASTE 426. Host ASTE 426 contains host STD 429, designating host DAT tables 420, which the machine then uses in host DAT to locate the operand; host prefixing follows host DAT to yield the host absolute address of the target location.

Thus, the present invention preserves the ability of a guest to manage multiple virtual address spaces via subprocess 190 without sacrificing the guest ART and guest DAT translation processes and the associated controls. Also, guest applications can freely intermix references to guest-managed and host-managed spaces. Moreover, access by applications to host-managed spaces passes through a guest ART process, which allows the guest to enforce restrictions on the host-managed spaces to which each application has access. Also, when a guest invokes the host managed storage subprocess 200, host DAT and host prefixing are applied regardless of the guest type. This allows V=R and V=F guests to access host virtual address spaces, which was not possible in prior art. Also, because access to host-managed spaces is available via the guest STD, even implicit-STD references, such as instruction fetches and linkage-stack accesses, can be directed to host-managed spaces.

Based on the foregoing, a computer system and process for address space allocation and address translation according to the present invention have been disclosed. However, numerous modifications and substitutions can be made without deviating from the scope of the present invention. For example, the foregoing process can be used in an environment where a personal computer/work station serves as the host and creates the guests. As another example, in the method illustrated in FIG. 5, hosts and/or guests could use ESA/390 authority tables to allow the machine to enforce access to spaces by applications at time of reference rather than keeping software permission records and consulting them at attachment-request time. As a final example, the translation process of FIG. 2 could be implemented partly or wholly in software or microcode rather than by hardware means. Therefore, the present invention has been disclosed by way of illustration and not limitation and reference should be made to the following claims to determine the scope of the present invention.

I claim:

1. A computer system for allocating and granting shared access to an address space in storage said system comprising:

host operating system means for creating first and second virtual machine guests; and wherein said first guest includes means, responsive to a request from a first application executing in said first guest to allocate an address space, for determining at least in part a storage region for said address space;

said first guest includes means, responsive to a request from said first application to grant shared access by a second application executing in said second guest to said address space, for notifying said host means that said second guest is authorized to access said address space and notifying said second guest that said second application is authorized to access said address space;

said second guest includes means, responsive to a request from said second application to access said address space, for determining whether said second application has authority to access said address space; and said host means also participates in determining a storage region for said address space.

2. A computer system as set forth in claim 1 further comprising hardware means for performing virtual address translation to determine at least in part a location in said address space to read or write.

3. A computer system as set forth in claim 1 further comprising means for passing an identifier of said address space from said first application to said second application.

4. A computer system as set forth in claim 3 further comprising:

means, within said first guest, for receiving an authorization from said first application that said second application has authority to access the address space corresponding to said identifier, and means for passing the authorization to said second guest.

5. A computer system for allocating and granting shared access to an address space in storage, said system comprising:

host operating system means for creating first and second virtual machine guests; and wherein said first guest includes means, responsive to a request from a first application executing in said first guest to allocate an address space, for determining at least in part a storage region for said address space;

said first guest includes means, responsive to a request from said first application to grant shared access by a second application executing in said second guest to said address space, for notifying said host means that said second guest is authorized to access said address space and notifying said second guest that said second application is authorized to access said address space;

said second guest includes means, responsive to a request from said second application to access said address space, for determining whether said second application has authority to access said address space; and said host means stores an indication whether said second guest means is authorized to access said address space, and further comprising access requesting means, within said second guest means, for asking said host means to grant access to said address space; and wherein said host means responds to the asking means by checking the indication for said second guest means and granting access to said second guest means to said address space if said second guest means is authorized to access said address space.

6. A computer system as set forth in claim 5 wherein the second guest determining means grants said second application access to said address space if said second application has authority to access said address space and denies said second application access to said address space if said second application does not have authority to access said address space.

7. A computer system for allocating and granting shared access to an address space in storage, said system comprising:

host operating system means for creating first and second virtual machine guests; and wherein said first guest includes means, responsive to a request from a first application executing in said first guest to allocate an address space, for determining at least in part a storage region for said address space;

said first guest includes means, responsive to a request from said first application to grant shared access by a second application executing in said second guest to said address space, for notifying said host means that said second guest is authorized to access said address space and notifying said second guest that said second application is authorized to access said address space;

said second guest includes means, responsive to a request from said second application to access said address space, for determining whether said second application has authority to access said address space; and said second guest includes means for limiting access to said address space to a single application within said second guest and wherein said single application is said second application.

8. A computer system as set forth in claim 7 wherein said first guest includes means, responsive to said request by said first application to grant access to said address space to said second application, for determining if said second application is authorized to access said address space.

9. A computer system as set forth in claim 7 wherein said second guest includes means, responsive to said request by said second application to access said address space, for determining if said second application is authorized to access said address space.

10. A computer system for allocating an address space in storage, said system comprising:

host operating system means for creating first and second virtual machine guests in first and second storage areas, respectively; and wherein said first guest includes means, responsive to a request from an application executing in said first guest to allocate a first address space for use only within said first guest, for determining, without assistance from said host means, a storage region within said first storage area for said first address space;

said first guest includes means, responsive to a request from said application to allocate a second address space for shared use within said first and second guests, for determining in part another storage region for said second address space and requesting participation by said host means in determining said other storage region; and said host means responds to said request from the determining and requesting participation means by participating in the determination of said other storage region.

11. A computer system as set forth in claim 10 wherein said application within said first guest has simultaneous access to said first and second address spaces.

12. A computer system as set forth in claim 10 further comprising hardware means for performing virtual address translation to determine at least in part a location in said second address space to read or write.

13. A computer system as set forth in claim 10 wherein said other storage region is outside of said first storage region.

14. A computer system for allocating an address space, said system comprising:

host operating system means for creating a plurality of virtual machine guests;

means, controlled by one of said guests and responsive to a request by an application executing in said one guest, for performing guest access register translation (ART) on an access list entry token (ALET) associated with said request to yield a guest segment table designation (STD);

means for converting said guest STD into a host ALET;

means, controlled by said host means, for performing host ART on said host ALET to yield a host STD; and means, controlled by said host means, for performing dynamic address translation (DAT) using said host STD.

15. A computer system as set forth in claim 14 further comprising means, controlled by said host means, for performing prefixing on a result of the dynamic address translation.

16. (Not Amended) A computer system as set forth in claim 14 wherein the guest STD comprises primary-list (PL) and access-list-entry number (ALEN) fields and the converting means places the PL and ALEN into assigned fields as part of the conversion of said guest STD into a host ALET.

17. A computer system as set forth in claim 14 wherein said plurality of guests comprise a V=R guest, a V=F guest and a V=V guest, and all of said guests are supported by the guest ART performing means, converting means, host ART performing means, and host DAT performing means.

18. A computer system as set forth in claim 14 wherein said host ART performing means assigns a same address space to two of said guests to be shared by said two guests.

19. A computer system as set forth in claim 17 wherein said host ART performing means assigns a same address space to said V=V guest and said V=F guest to be shared by said V=V and V=F guests.

20. A computer system as set forth in claim 17 further comprising a second V=V guest and wherein said host ART performing means assigns a same address space to both said V=V guests to be shared by said two V=V guests.

21. A computer system as set forth in claim 14 further comprising:

means, controlled by another of said guests and responsive to another request by another application executing in said other guest, for performing guest ART on another ALET associated with said other request to yield another guest STD;

means, controlled by said guest, for performing DAT using said other guest STD; and means, controlled by said guest, for performing prefixing on a result of said DAT.

22. A computer system as set forth in claim 21 wherein said plurality of guests comprise a V=R guest, a V=F guest and a V=V guest, and further comprising means, controlled by said host means, for performing DAT on an output of the guest prefix performing means for said V=V guest;

means, controlled by said host means, for performing prefixing on an output of the host performing DAT means for said V=V guest; and means, controlled by said host means, for performing address space offset on an output of the guest prefix performing means for said V=F guest.

23. A computer system as set forth in claim 21 wherein said guest STD can exhibit a first format comprising a segment table origin field and a segment table length field or a second format comprising a primary list bit and an access list entry number;

said guest STD in said first format is processed by the guest DAT performing means and the guest prefix performing means; and said guest STD in said second format is processed by the converting means, host ART performing means and host DAT performing means.

24. A computer system as set forth in claim 23 further comprising means for determining which format the guest STD exhibits.

25. A computer system as set forth in claim 24 wherein a format of said request and a format of said guest ALET conform to ESA/390 architecture.

26. A computer system as set forth in claim 24 wherein said request is a write request.

27. A computer system as set forth in claim 25 wherein the guest ART performing means and said guest STD are compatible with ESA/390 architecture.

28. A computer system for allocating and granting shared access to an address space in storage, said system comprising:

host operating system means for creating first and second virtual machine guests; and wherein said first guest includes means, responsive to a request from a first application executing in said first guest to allocate an address space, for determining at least in part a storage region for said address space;

said first guest includes means, responsive to a request from said first application to grant shared access by a second application executing in said second guest to said address space, for notifying said host means that said second guest is authorized to access said address space and notifying said second guest that said second application is authorized to access said address space;

said second guest includes means, responsive to a request from said second application to access said address space, for determining whether said second application has authority to access said address space; and said second guest includes means for requesting from said host means a token for said address space and means for supplying said token to said second application upon request by said second application.

* * * * *